United States Patent
Yadav et al.

(10) Patent No.: US 12,386,713 B2
(45) Date of Patent: *Aug. 12, 2025

(54) MANAGING USE OF A SHARED VIRTUAL DISK FOR ACCESSING DATA IN FILE BASED BACKUPS BY MULTIPLE VIRTUAL MACHINES

(71) Applicant: Dell Products L.P., Round Rock, TX (US)

(72) Inventors: Sunil Yadav, Punjab (IN); Shelesh Chopra, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 112 days.

This patent is subject to a terminal disclaimer.

(21) Appl. No.: 18/340,927

(22) Filed: Jun. 26, 2023

(65) Prior Publication Data

US 2024/0427673 A1    Dec. 26, 2024

(51) Int. Cl.
*G06F 11/14*    (2006.01)

(52) U.S. Cl.
CPC ...... *G06F 11/1484* (2013.01); *G06F 11/1435* (2013.01); *G06F 11/1464* (2013.01)

(58) Field of Classification Search
CPC ............ G06F 11/1484; G06F 11/1435; G06F 11/1464
See application file for complete search history.

(56) References Cited

U.S. PATENT DOCUMENTS

| 6,185,574 | B1 | 2/2001 | Howard et al. |
| 7,694,103 | B1 | 4/2010 | Kushwah |
| 8,037,032 | B2 | 10/2011 | Pershin et al. |
| 9,171,002 | B1 | 10/2015 | Mam et al. |
| 9,348,827 | B1 | 5/2016 | Patwardhan et al. |
| 9,424,137 | B1 | 8/2016 | Mam |
| 9,569,446 | B1 | 2/2017 | Feathergill et al. |

(Continued)

FOREIGN PATENT DOCUMENTS

| WO | 2011002777 A2 | 1/2011 |
| WO | 2015110171 A1 | 7/2015 |

(Continued)

OTHER PUBLICATIONS

Lipika Deka et al., Consistent Online Backup in Transactional File Systems, Nov. 2014, pp. 2676-2688, vol. 26, Issue: 11 (13 pages).

*Primary Examiner* — Tony Wu
(74) *Attorney, Agent, or Firm* — Chamberlain, Hrdlicka, White, Williams & Aughtry; Aly Z. Dossa

(57) ABSTRACT

A method for managing file based backups (FBBs) includes obtaining, by a FBB metadata file operating in a production host and from an application, a shared access request for a plurality of virtual machines (VMs) to access a FBB, accessing a FBB metadata file associated with the FBB to determine file data accessible to the plurality of VMs, performing an attribute analysis on the FBB metadata file, wherein the storage location attributes are each associated with a storage location of a portion of the file data in a backup storage system, generating a shared virtual disk in the production host based on the attribute analysis, wherein the shared virtual disk maps the file data to the storage locations, generating the plurality of VMs, wherein the VMs read from and write to the shared virtual disk, and enabling access to the virtual machines by the application.

20 Claims, 13 Drawing Sheets

(56) References Cited

U.S. PATENT DOCUMENTS

| | | |
|---|---|---|
| 10,146,629 B1 | 12/2018 | Yadav et al. |
| 10,241,870 B1 | 3/2019 | Beatty |
| 10,372,547 B1 | 8/2019 | Zhu et al. |
| 10,642,790 B1 | 5/2020 | Brenner |
| 11,340,824 B1 | 5/2022 | Yadav et al. |
| 11,513,921 B1 | 11/2022 | Yadav et al. |
| 2004/0028042 A1 | 2/2004 | Srinivasan et al. |
| 2005/0078196 A1 | 4/2005 | Okamoto |
| 2005/0166082 A1 | 7/2005 | Williams et al. |
| 2005/0246398 A1 | 11/2005 | Barzilai et al. |
| 2008/0124050 A1 | 5/2008 | Deschamp et al. |
| 2009/0276591 A1 | 11/2009 | Mu et al. |
| 2016/0127307 A1 | 5/2016 | Jain et al. |
| 2016/0188582 A1 | 6/2016 | Sprague et al. |
| 2017/0090770 A1 | 3/2017 | Minamiura et al. |
| 2018/0295400 A1 | 10/2018 | Thomas et al. |
| 2018/0322017 A1 | 11/2018 | Maccanti et al. |
| 2019/0324661 A1 | 10/2019 | Kottomtharayil et al. |
| 2020/0245034 A1 | 7/2020 | Dunker et al. |
| 2021/0240569 A1 | 8/2021 | Chopra et al. |
| 2021/0326220 A1 | 10/2021 | Srinivasan et al. |
| 2021/0406129 A1 | 12/2021 | Zheng et al. |
| 2022/0382641 A1 | 12/2022 | Chopra et al. |

FOREIGN PATENT DOCUMENTS

| | | |
|---|---|---|
| WO | 2015142676 A1 | 9/2015 |
| WO | 2018081737 A1 | 5/2018 |

MANAGING USE OF A SHARED VIRTUAL DISK FOR ACCESSING DATA IN FILE BASED BACKUPS BY MULTIPLE VIRTUAL MACHINES

BACKGROUND

Computing devices in a system may include any number of internal components such as processors, memory, and persistent storage. The storage of data across multiple computing devices may require significant use of such internal components. Providing instant access to data stored in a backup storage system may improve the overall operation of such computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
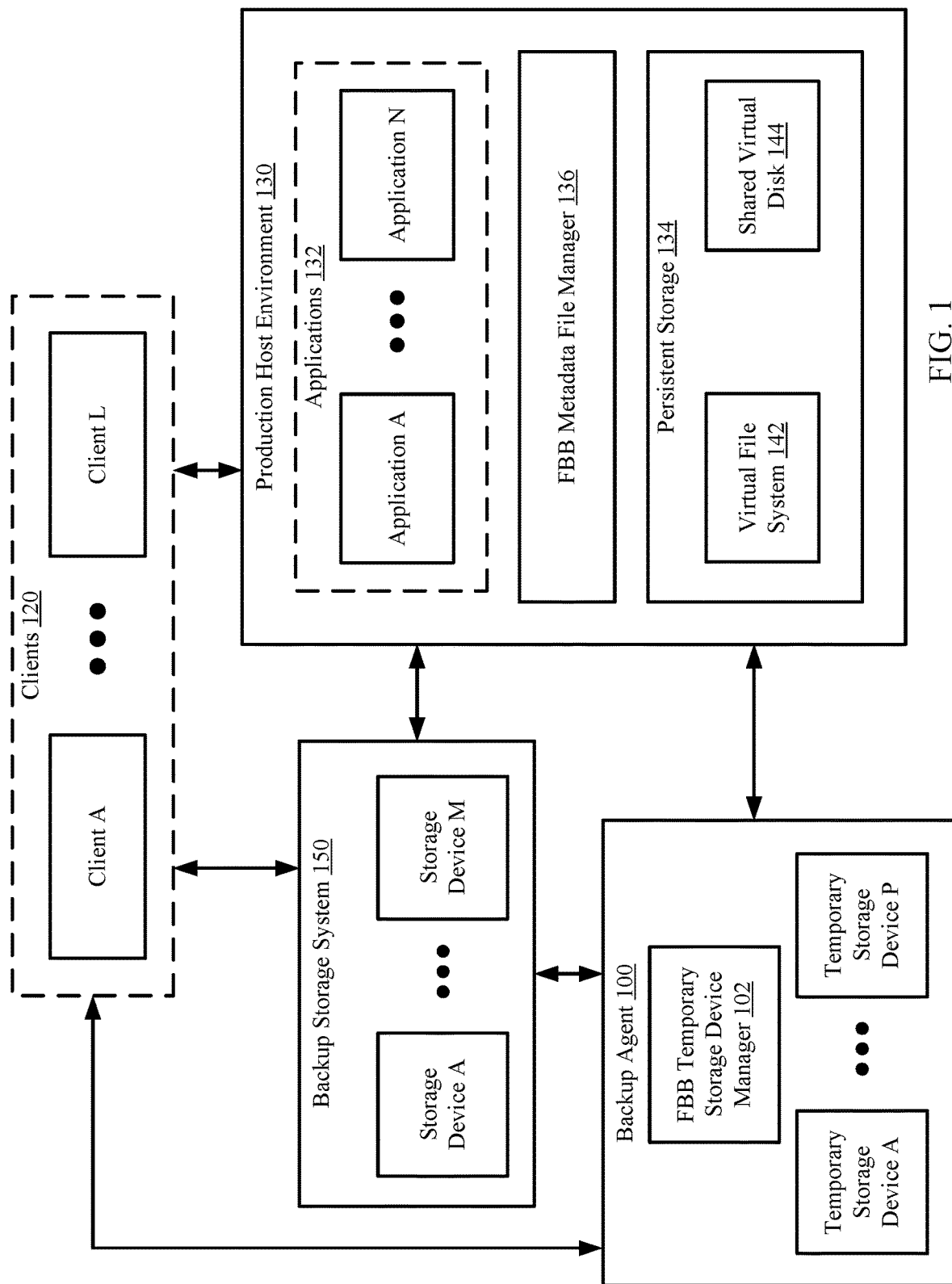
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing file based backups. Embodiments of the invention relate to a system for utilizing a file based backup (FBB) metadata file of a FBB stored in a backup storage system to enable access to the data of the FBB by an application managing the file system corresponding to the FBB. The application may operate from a production host environment that is operatively connected to the backup storage system. The FBB metadata file may be utilized by obtaining attributes corresponding to the data in the FBB, including the storage location, file name, and file size, and allowing access to those attributes by the applications. A FBB metadata file manager executing on the production host environment may utilize the obtained attributes to enable access to the data (e.g., the files) in the FBB by the applications. For example, the FBB metadata file manager may implement a virtual file system that specifies the files in the file based backup and the storage location in the backup storage system.

Embodiments of the invention further may include a method for managing the data accessed by the applications by generating temporary storage devices. A backup agent would manage the generation and execution of the temporary storage devices. The storage devices may be executed in the production host environment, in the backup storage system, or in an additional entity without departing from the invention. A temporary storage device manager may generate the temporary storage devices and populate them with requested data from a FBB stored in the backup storage device. The temporary storage device manager may store a copy of the requested data in the temporary storage device. The application requesting the data may read and/or write to the data in the temporary storage device. The temporary storage device may be used in the generation of future FBBs of the file system used by the application.

Embodiments disclosed herein address the use case where instant access exposes only the portion of the backup (e.g., a portion of the files in the backup) that belong to the user initiating the instant access and not other users' files and folders. Exposing only a selected part of a backup may utilize intelligent use of the metadata file if a backup has captured it as part of backup itself. Embodiments disclosed herein enable the selected instant access without exposing entire backup copy for reading and writing by other users.

Embodiments disclosed herein further provide methods and systems for providing instant access of data in a backup storage system searched using a search engine.

Embodiments disclosed herein further include methods and systems for restricting access to storage units to only specific backup copies/workload using intelligent leverage of instant access techniques. In one or more embodiments, a service component is created which runs on the host. The service component may be, for example the FBB metadata file manager.

Embodiments disclosed herein further include methods and systems for multiplexing a backup copy to enable guest clustering applications (e.g., virtual machines) and data sharing in real time among instant accessed instances using nested instant access by enabling data sharing among applications which are running on instantly accessed backup copies. This may ensure that data is not overwritten by each other. For example, embodiments disclosed herein may be used in scenarios in which a database backup data is accessed by multiple SQL instances running in their own VMs.

Embodiments disclosed herein further include methods and systems for intelligent leverage of instant access technique to enable auto-destruction of mounted volumes (e.g., virtual file systems) or resources and free the user from the logistics of life cycle management. There may be beneficial use cases for enabling a resource or a mounted backup to auto-destroy itself at the appropriate moment so that no ongoing operation is impacted and at same time such volumes are not left mounted for indefinite periods of time. Such auto-destruction may be based on a self-destruction criterion. The self-destruction criterion may be time based (e.g., based on an idle timer) and based on the size of the open backups.

FIG. 1 shows an example system in accordance with one or more embodiments of the invention. The system includes a backup agent (100), one or more clients (120), a production host environment (130) and a backup storage system (150). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the backup agent (100) manages backup operations of data in the production host environment (130). The backup operations may include generating, storing, and/or recovering file based backups (FBBs) stored in the backup storage system (150). In one or more embodiments of the invention, a FBB is a backup of a file system that has been updated, modified, and/or otherwise accessed by the applications (132) in the production host environment (130).

In one or more embodiments of the invention, the backup agent (100) further includes a FBB temporary storage device manager (102) (also referred to as a temporary storage device manager). The temporary storage device manager (102) generates one or more temporary storage devices. Each temporary storage devices may include at least a portion of data in a FBB. The data may be copied from the FBB and stored in the temporary storage device such that the data in the temporary storage devices is accessible by the applications (132).

Figure 5:
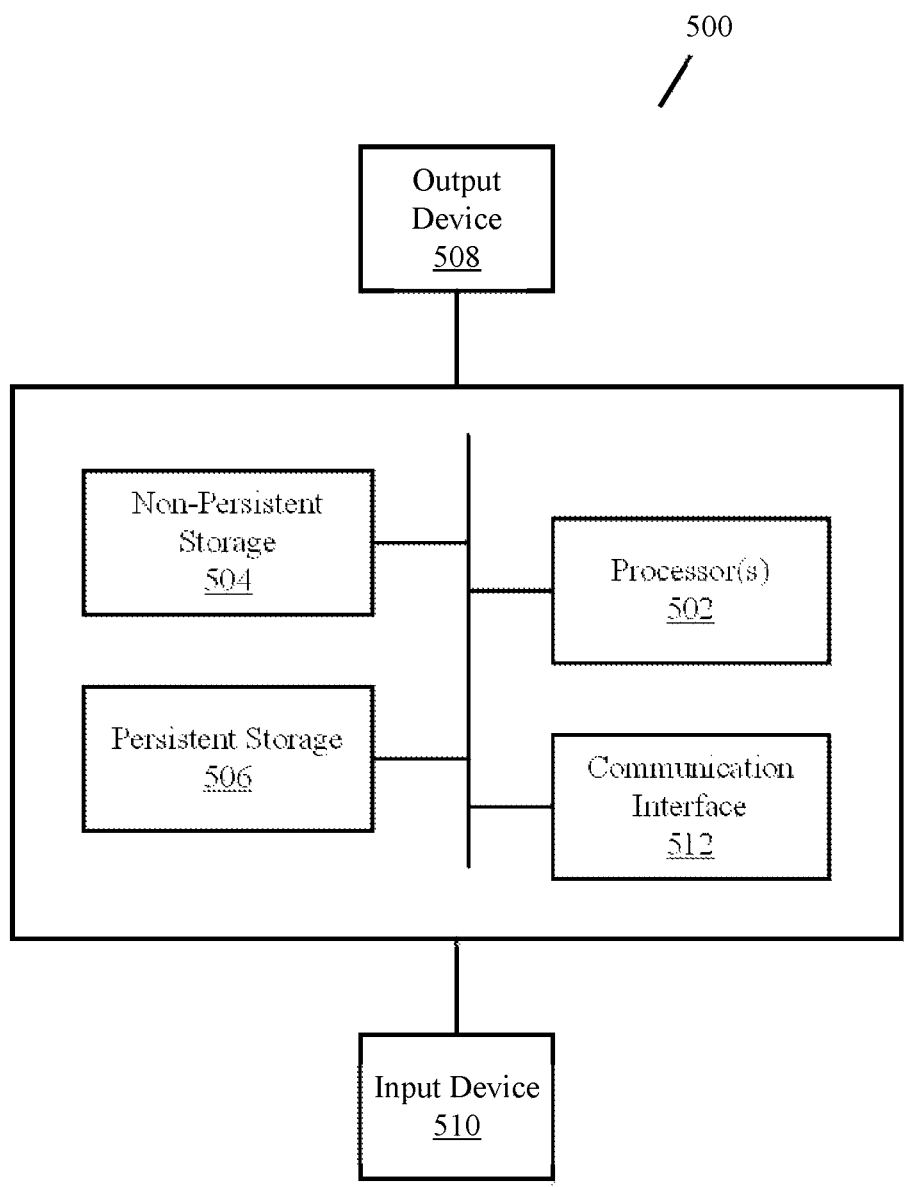
FIG. 5 shows a diagram of a computing device in accordance with one or more embodiments of the invention.

In one or more embodiments of the invention, the backup agent (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (100) described throughout this disclosure.

In one or more embodiments of the invention, the backup agent (100) is implemented as a logical device. The logical device may utilize the computing resources of any number of computing devices and thereby provide the functionality of the backup agent (100) described throughout this disclosure.

While the backup agent (100) is illustrated in FIG. 1 as being a separate entity, the backup agent (100), and any components thereof, may be executed as part of the production host environment (130), the backup storage system (150), the clients (120), and/or any other entities without departing from the invention.

In one or more embodiments of the invention, the production host environment (130) hosts applications (132). The applications (132) may be logical entities executed using computing resources (not shown) of the production host environment (130). Each of the applications may be performing similar or different processes. In one or more embodiments of the invention, the applications (132) provide services to users, e.g., clients (not shown). For example, the applications (132) may host components. The components may be, for example, instances of databases, email servers, and/or other components. The applications (132) may host other types of components without departing from the invention.

In one or more embodiments of the invention, the applications (132) generate application data to be utilized for the servicing of the users. The application data may be organized in accordance with a file system. The file system may include any number of files organized into directories. For example, the directories may include paths for accessing the files. The file system may be stored in a container stored in the persistent storage (134) of the production host environment (130).

In one or more of embodiments of the invention, the applications (132) are implemented as computer instructions, e.g., computer code, stored on a persistent storage (e.g., 134) that when executed by a processor(s) of the production host environment (130) cause the production host environment (130) to provide the functionality of the applications (132) described throughout this application.

In one or more embodiments of the invention, the FBB metadata file manager (136) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the FBB metadata file manager (136) described throughout this disclosure and/or all, or a portion thereof, of the methods of FIGS. 3A-3E.

In one or more embodiments of the invention, the FBB metadata file manager (136) is implemented as a logical device. The logical device may utilize the computing resources of any number of computing devices and thereby provide the functionality of the FBB metadata file manager (136) described throughout this disclosure and/or all, or a portion thereof, of the methods of FIGS. 3A-3E.

While the FBB metadata file manager (136) is illustrated in FIG. 1 as being a part of the production host environment (130), the FBB metadata file manager (136), and any components thereof, may be executed as a separate entity or as part of the backup storage system (150), the clients (120), and/or any other entities without departing from the invention.

In one or more embodiments of the invention, the production host environment (130) further includes a FBB metadata file manager (136). In one or more embodiments of the invention, the FBB metadata file manager (136) obtains FBB metadata files, obtains the relevant metadata attributes, and prepares a virtual file system (142) (also referred to as a virtual file system) for the applications (132) to use when accessing data in the FBBs stored in the backup storage system (150). The FBB metadata file manager (136) may generate the FBB virtual file system (142) by identifying a set of attributes for a selected or requested set of files in a FBB and providing a mapping of the data in the selected requested set of files to the requesting applications (132). The mapping may be stored in the virtual file system (142). The FBB metadata file manager (136) may generate the virtual file system (142) in accordance with, for example, the methods of FIGS. 3A-3C.

The FBB metadata file manager (136) may further include functionality for generating a shared virtual disk (144). In one or more embodiments, the shared virtual disk (144) may include a copy of requested data from the backup storage system (150) to be accessible by instances of the applications (132). The shared virtual disk (144) may be written to or read from by multiple applications (132).

In one or more embodiments of the invention, the production host environment (130) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

In one or more embodiments of the invention, the production host environment (130) is implemented as a logical device. The logical device may utilize the computing resources of any number of computing devices and thereby provide the functionality of the production host environment (130) described throughout this application.

In one or more embodiments of the invention, each of the backup storage systems (150) stores FBBs in its storage devices. The FBBs may be backups for file systems. The file systems may be based on files used by the applications (132). The FBBs may each correspond to a point in time of the file system. The FBBs may be used to restore the file system to such corresponding point in time. Each storage device may be a physical or logical partitioning of storage.

In one or more embodiments of the invention, the backup storage system (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

Figure 2:
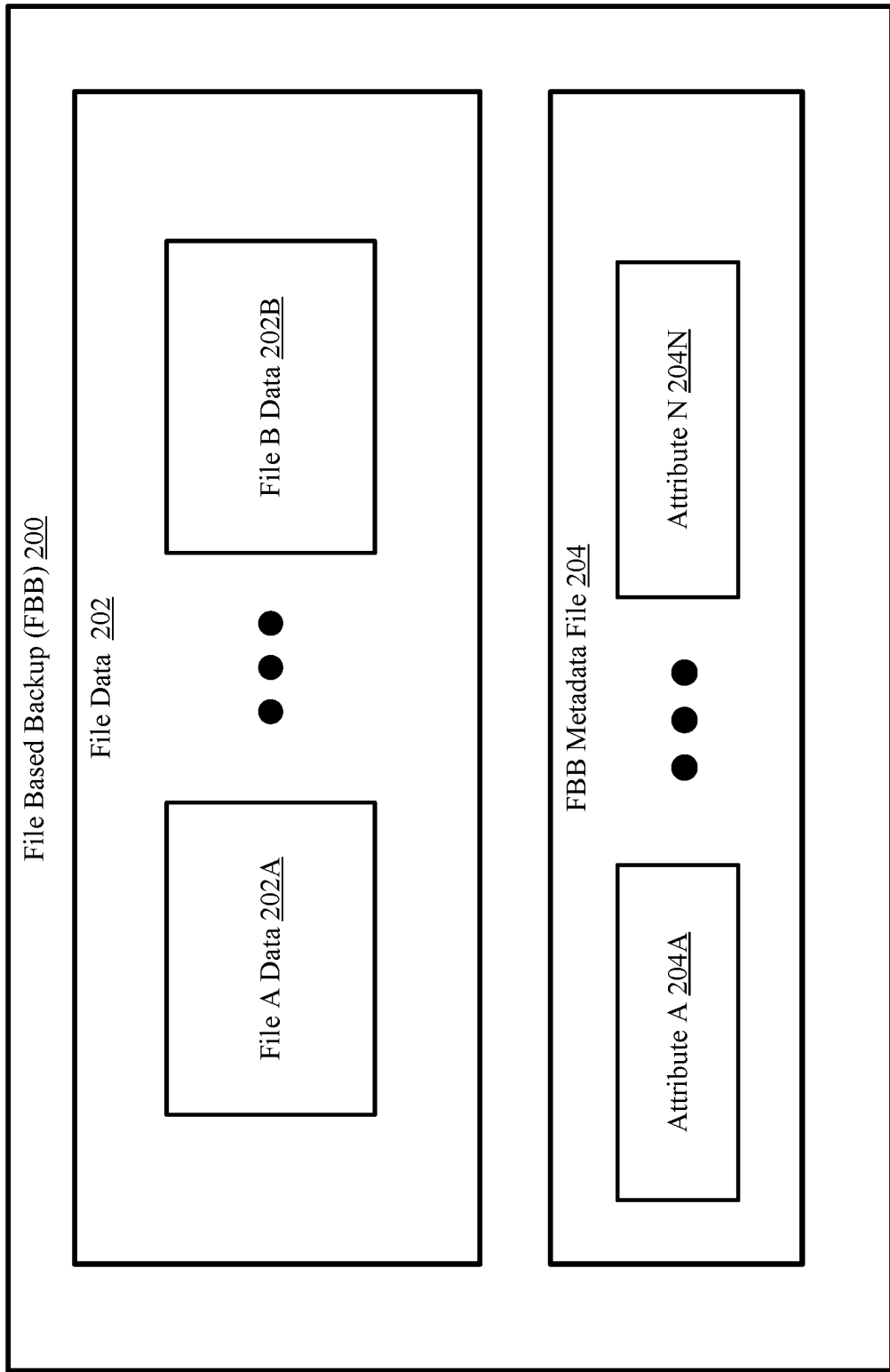
FIG. 2 shows a diagram of a file based backup (FBB) in accordance with one or more embodiments of the invention.

FIG. 2 shows a diagram of a file based backup without departing from the invention. The file based backup (200) may be an embodiment of a file based backup discussed in FIG. 1. As discussed above, the file based backup (200) is a data structure that includes the data in a file system at a point in time. The file based backup (200) may include file system data (202) and a FBB metadata file (204).

In one or more embodiments of the invention, the file system data includes data for one or more files (202A, 202B). Each file data (202A, 202B) may correspond to a file in the file system. The file data (also referred to as file system data) may further include data tags. In one or more embodiments of the invention, the data tags may be associated with the storage format of the file data (202A, 202B). For example, the file data (202A, 202B) may be stored in a common data streaming format (CDSF). In one or more embodiments of the invention, the CDSF may be a format that includes the data tags that may correspond to a portion of data and may specify the FBB corresponding to the portion of data. In this manner, the file data (202A, 202B) may include: (i) the data of the files and/or file system and (ii) the data tags that specify the metadata of one or more portions of data of the file data (202A, 202B).

In one or more embodiments of the invention, the FBB metadata file (204) is a data structure that includes metadata corresponding to the files in the file system data (202). The metadata may include attributes (204A, 204N) of a file. Each attribute may describe an aspect of a file. Examples of attributes (204A, 204N) include, but are not limited to: a file identifier, a parent file identifier, a container identifier, a file size, a timestamp, a hash value of the file data, a checksum value of the file data, a header size, a set of user identifiers associated with the file (e.g., that has access to the file) and an offset of the file in the backup storage system in which the file is stored.

In one or more embodiments of the invention, the attributes in the FBB metadata file (204) are grouped into attribute regions. The attribute regions may be groupings of the metadata attributes. The attribute regions may be grouped based on a likelihood of an attribute changing between various iterations of a FBB (e.g., 200).

For example, consider a scenario in which a first attribute (e.g., a file size) changes from a first iteration of a file system of a first FBB to a second iteration of the file system of a second FBB. In contrast, a second attribute (e.g., a file name) may remain the same between the two iterations of the file system. In such scenario, based on their likelihood to change in future iterations of the file system, the first attribute may correspond to a first attribute region, and the second attribute may correspond to a second attribute region.

FIGS. 3A-3E show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3E may be performed in parallel with any other steps shown in FIGS. 3A-3E without departing from the scope of the invention.

Figure 3A:
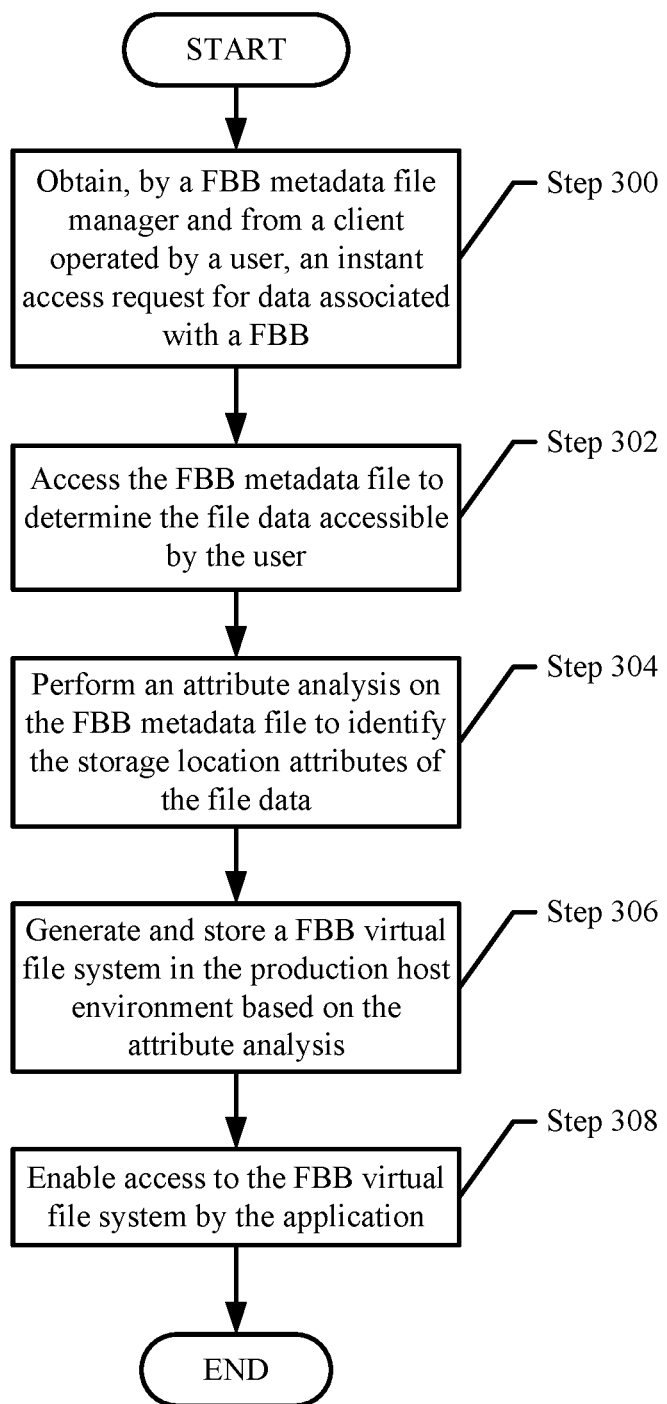
FIG. 3A shows a flowchart for managing instant access of a file based backup based on a user in accordance with one or more embodiments of the invention.

FIG. 3A shows a flowchart for managing instant access of a file based backup based on a user in accordance with one or more embodiments of the invention. The method shown in FIG. 3A may be performed by, for example, a FBB metadata file manager (e.g., 136, FIG. 1). Other components of the system illustrated in FIG. 1 may perform the method of FIG. 3A without departing from the invention.

Turning to FIG. 3A, in step 300, an instant access request is obtained for data associated with a file based backup (FBB). In one or more embodiments of the invention, the instant access request specifies mounting a file system of at least a portion of the FBB in the production host environment such that the application has access to the data (e.g., files) in the FBB. The FBB mount request may specify the point in time associated with the file system. The instant access request may be obtained from an application operated by a user. The instant access request may specify read-only access of the data in the file system of the FBB.

In step 302, a FBB metadata file corresponding to the FBB is accessed from the backup storage system to determine file data accessible to the user. In one or more embodiments of the invention, the FBB metadata file manager may send a request (e.g., as an API command) to the backup storage system that specifies the FBB metadata file of the identified FBB. Based on the obtained FBB metadata file, the FBB metadata file manager may determine the files and/or directories that are associated with the user of the application sending the instant access request. The data of the determined files and/or directories are included in the determined file data. In this manner, if the FBB includes other files that are associated with other users that are not the user sending the instant access request, the other files are not identified or provided to the user in response to the instant access request.

In step 304, an attribute analysis is performed on attributes specified in the FBB metadata file associated with the determined file data to identify storage location attributes in the FBB metadata file. In one or more embodiments of the invention, the attribute analysis is a process for analyzing the attributes specified in the FBB metadata file that specify the storage location of the file data and enable access to the file data. Such attributes may include, but are not limited to: an offset of a portion of data in a storage device, a size of the portion of data, a file name corresponding to the portion of data, and a file path based on the file system.

In step 306, a FBB virtual file system is generated and stored in the production host environment based on the attribute analysis. In one or more embodiments of the invention, the FBB virtual file system is an organization of the storage attributes such that the application may access (e.g., read) data of the file system from the FBB. The FBB virtual file system would be organized on a file-storage basis such that the FBB virtual file system would specify each file in the file system of the FBB (that is accessible by the requesting user) and the storage of such file data corresponding to the accessible file.

In step 308, access to the FBB virtual file system by the application is enabled. In one or more embodiments of the invention, the access includes establishing the organization of the FBB virtual file system so that the application may send read requests for the data (e.g., one or more files) in the FBB. The entity servicing the read request (e.g., a driver in the production host environment) may utilize the FBB virtual file system to identify the file(s), the storage location of the data corresponding to the file(s), and send API requests to the backup storage system to obtain the specified data.

In one or more embodiments of the invention, the access to the FBB virtual file system may include obtaining a read request for file data in the file system data in the FBB. The file system data may include files. The entity (e.g., the FBB metadata file manager) managing the FBB virtual file system may identify a file path corresponding to the requested data. The file path may specify the portions of data corresponding to the requested files. Based on the identified file path, the requested data may be obtained from the backup storage system. For example, a copy of the requested data may be generated and provided to the application.

Figure 3B:
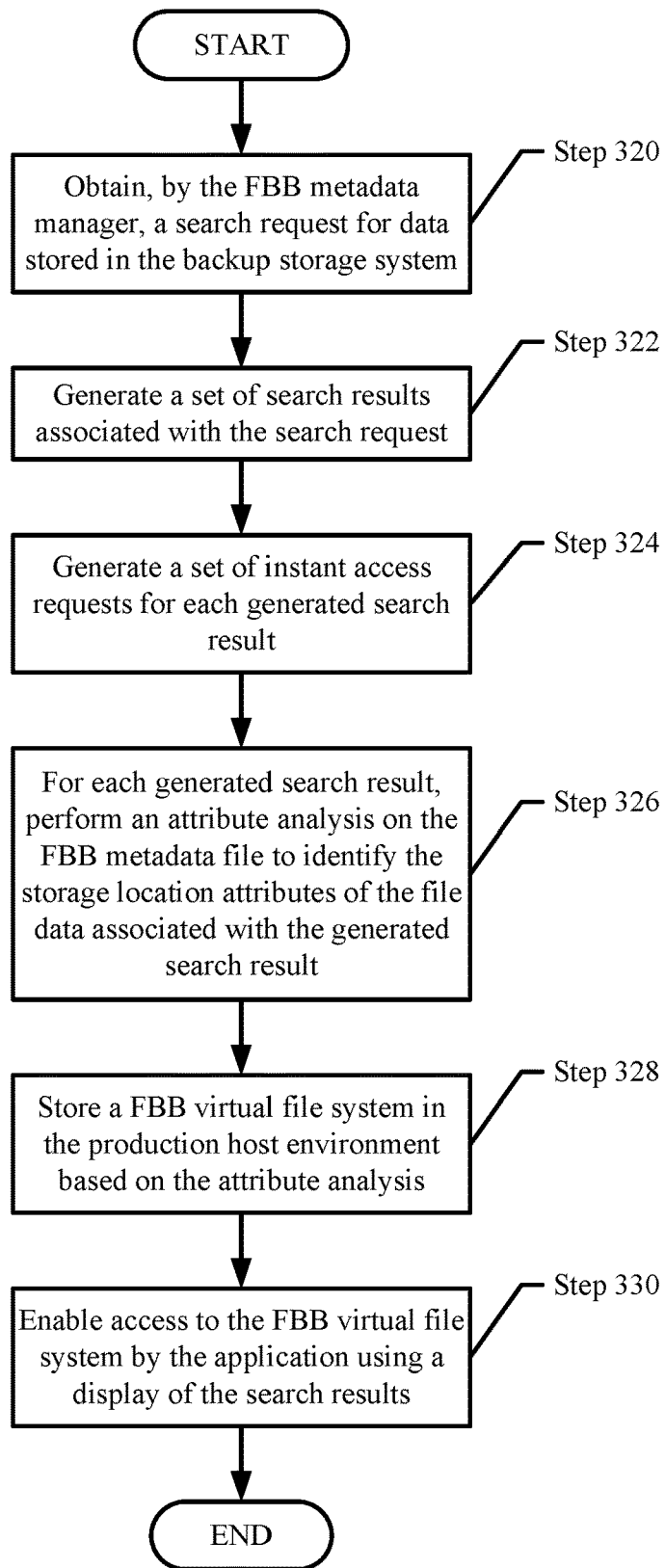
FIG. 3B shows a flowchart for managing instant access of a file based backup based on a user in accordance with one or more embodiments of the invention.

FIG. 3B shows a flowchart for managing instant access of a file based backup based on a user in accordance with one or more embodiments of the invention. The method shown in FIG. 3B may be performed by, for example, a FBB metadata file manager (e.g., 136, FIG. 1). Other components of the system illustrated in FIG. 1 may perform the method of FIG. 3B without departing from the invention.

In step 320, a search request is obtained for data stored in the backup storage system. The data may be associated with one or more FBBs. The search request may specify a component of a file, a file, a keyword, a string of characters associated with one or more files, and/or other contents associated with one or more files in one or more FBBs in the backup storage system.

In step 322, a set of search results associated with the search request is generated. In one or more embodiments, each search result in the set of search results is associated with a file stored in a FBB. Each search result may include file identifiers of a file in the backup storage system that may be associated with the contents specified in the search request. In one or more embodiments, at least one or more files specified in the search results are different versions (e.g., a file at different points in time) of a file. In one or more embodiments, the set of search results are organized based on, for example, a relevancy to the search request, a timestamp of the associated file(s), or alphabetically by one of the file attributes (e.g., by file identifier).

In one or more embodiments of the invention, the set of search results are filtered based on data accessible to the user. For example, each set of search results may be accessible to the user in accordance with FIG. 3A. Any files associated with the search request and not accessible to the user may not be specified in the set of search results.

In step 324, a set of instant access requests is generated for each generated search result. In one or more embodiments, the instant access requests each specify a file in one of the set of search results. Each instant access request may be similar to an instant access request discussed throughout this disclosure.

In step 326, for each generated search result, an attribute analysis is generated on the FBB metadata file to identify the storage location of attributes of the file data associated with the generated search results. Similar to step 304 of FIG. 3A, the attribute analysis is a process for analyzing the attributes specified in the FBB metadata file that specify the storage location of the file data for the corresponding search result, and enable access to the file data. Such attributes may include, but are not limited to: an offset of a portion of data in a storage device, a size of the portion of data, a file name corresponding to the portion of data, and a file path based on the file system.

In step 328, a FBB virtual file system is generated and stored in the production host environment based on the attribute analysis. In one or more embodiments of the invention, the FBB virtual file system is an organization of the storage attributes such that the application may access (e.g., read) data of the file system from the FBB. The FBB virtual file system would be organized on a file-storage basis such that the FBB virtual file system would specify each file in the set of search results of the FBB and the storage of the data corresponding to each file.

In one or more embodiment, the user may send a second a second search request. A second set of search results may be generated based on the second search request. In such embodiments, the FBB virtual file system may be updated to provide a mapping of the files specified in the second set of search results. Alternatively, in other embodiments, a new FBB virtual file system may be generated that provides a mapping of the files specified in the second set of search results. In this manner, the second FBB virtual file system may be accessible to the user sending the second search request.

In step 330, access to the FBB virtual file system by the application is enabled. In one or more embodiments of the invention, the access includes establishing the organization of the FBB virtual file system so that the application may send read requests for the data (e.g., one or more files) in the FBB. The entity servicing the read request (e.g., a driver in the production host environment) may utilize the FBB virtual file system to identify the file(s), the storage location of the data corresponding to the file(s), and send API requests to the backup storage system to obtain the specified data.

In one or more embodiments of the invention, the access to the FBB virtual file system may include obtaining a read request for file data in the file system data in the FBB. The file system data may include files. The entity (e.g., the FBB metadata file manager) managing the FBB virtual file system may identify a file path corresponding to the requested data. The file path may specify the portions of data corresponding to the requested files. Based on the identified file path, the requested data may be obtained from the backup storage system. For example, a copy of the requested data may be generated and provided to the application.

Figure 3C:
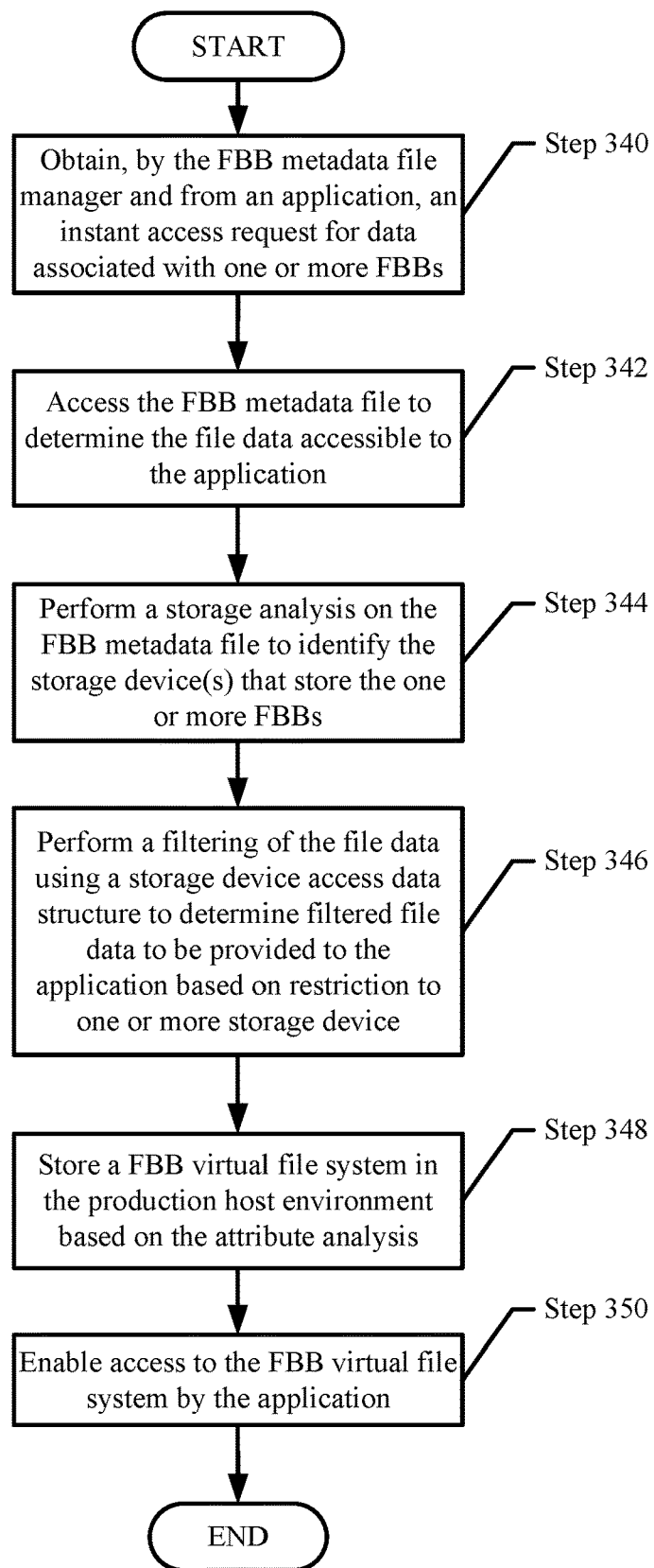
FIG. 3C shows a flowchart for managing instant access of a file based backup based on storage devices in the backup storage system in accordance with one or more embodiments of the invention.

FIG. 3C shows a flowchart for managing instant access of a file based backup based on storage devices in the backup storage system in accordance with one or more embodiments of the invention. The method shown in FIG. 3C may be performed by, for example, a FBB metadata file manager (e.g., 136, FIG. 1). Other components of the system illustrated in FIG. 1 may perform the method of FIG. 3C without departing from the invention.

In step 340, an instant access request for data associated with one or more FBBs is obtained. In one or more embodiments of the invention, the instant access request specifies mounting a file system of at least a portion of the FBB in the production host environment such that the application has access to the data (e.g., files) in the FBB. The FBB mount request may specify the point in time associated with the file system.

In step 342, a FBB metadata file corresponding to the FBB is accessed from the backup storage system to determine file data accessible to the user. In one or more embodiments of the invention, the FBB metadata file manager may send a request (e.g., as an API command) to the backup storage system that specifies the FBB metadata file of the identified FBB. Based on the obtained FBB metadata file, the FBB metadata file manager may determine the files and/or directories that are associated with the user of the application sending the instant access request. The data of the determined files and/or directories are included in the determined file data. In this manner, if the FBB includes other files that are associated with other users that are not the user sending the instant access request, the other files are not identified or provided to the user in response to the instant access request.

In step 344, a storage analysis on the FBB metadata file to identify the storage devices that store the one or more FBBs. In one or more embodiments, the storage analysis includes determining the storage device(s) in which each FBB is stored. The storage analysis may be performed by searching the FBB in the backup storage system and identifying the storage device of the corresponding FBB.

In step 346, a filtering of the file data is performed using a storage device access data structure to determine filtered file data to be provided to the application based on restriction to one or more storage devices. In one or more embodiments of the invention, the filtering includes, for each FBB specified in the instant access request, identifying the storage device and determining whether the application is authorized to access the storage device using the storage device access data structure. The storage device access data structure specifies each application and/or user and the storage devices to which the application and/or user has access to. The filtering includes identifying any FBBs that are stored in the authorized storage devices and including such FBBs in a FBB virtual file system. Further, any FBBs stored in storage devices not authorized for access by the user are not included in the virtual file system.

In step 346, a FBB virtual file system is generated and stored in the production host environment based on the attribute analysis. In one or more embodiments of the invention, the FBB virtual file system is an organization of the storage attributes such that the application may access (e.g., read) data of the file system from the FBBs included to be provided to the application. The FBB virtual file system would be organized on a file-storage basis such that the FBB virtual file system would specify each file in the file systems of the authorized FBBs and the storage of the data corresponding to each file.

In step 348, access to the FBB virtual file system by the application is enabled. In one or more embodiments of the invention, the access includes establishing the organization of the FBB virtual file system so that the application may send read requests for the data (e.g., one or more files) in the FBBs. The entity servicing the read request (e.g., a driver in the production host environment) may utilize the FBB virtual file system to identify the file(s), the storage location of the data corresponding to the file(s), and send API requests to the backup storage system to obtain the specified data.

Figure 3D:
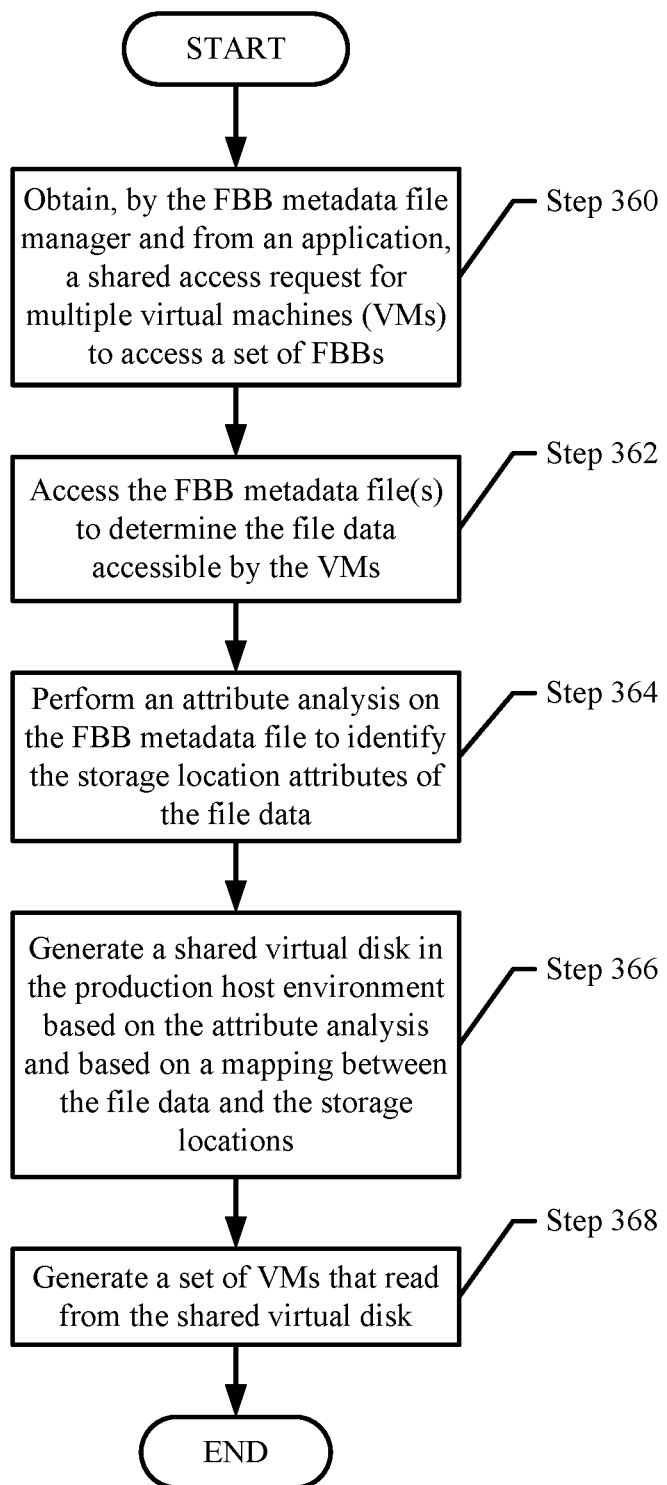
FIG. 3D shows a flowchart for generating and storing a shared virtual disk in accordance with one or more embodiments of the invention.

FIG. 3D shows a flowchart for generating and storing a file based backup based on a target backup storage system in accordance with one or more embodiments of the invention. The method shown in FIG. 3D may be performed by, for example, a backup agent (e.g., 100, FIG. 1). Other components of the system illustrated in FIG. 1 may perform the method of FIG. 3D without departing from the invention.

In step 360, a shared access request is obtained for multiple virtual machines to access a set of FBBs. In one or more embodiments, the shared access request specifies providing access to read and/or write data to any number of virtual machines. The shared access request may further specify the generation of the virtual machines.

In step 362, the FBB metadata file(s) are accessed to determine the file data accessible by the VMs. In one or more embodiments of the invention, the FBB metadata file manager may send a request (e.g., as an API command) to the backup storage system that specifies the FBB metadata file of the identified FBB. Based on the obtained FBB metadata file, the FBB metadata file manager may determine the files and/or directories that are associated with the user of the application sending the instant access request. The data of the determined files and/or directories are included in the determined file data. In this manner, if the FBB includes other files that are associated with other users that are not the user sending the instant access request, the other files are not identified or provided to the user in response to the instant access request.

In step 364, an attribute analysis is performed on attributes specified in the FBB metadata file associated with the determined file data to identify storage location attributes in the FBB metadata file. In one or more embodiments of the invention, the attribute analysis is a process for analyzing the attributes specified in the FBB metadata file that specify the storage location of the file data and enable access to the file data. Such attributes may include, but are not limited to: an offset of a portion of data in a storage device, a size of the portion of data, a file name corresponding to the portion of data, and a file path based on the file system.

In step 366, a shared virtual disk is generated in the production host environment based on the attribute analysis. In one or more embodiments of the invention, the shared virtual disk is a data structure that includes a copy of the file data specified in the shared access request. The shared virtual disk would be organized to specify each file in the file system of the FBBs and the storage of the data corresponding to each file. Further, the shared virtual disk In step 368, a set of virtual machines are generated. In one or more embodiments, the set of virtual machines may each operate an instance of an application (e.g., each operated by a client). In one or more embodiments, the set of virtual machines is generated by booting up a guest operating system for each of the set of virtual machines, and directing the guest operating system to read from the shared virtual disk. In this manner, access to the shared virtual disk by the virtual machines is enabled. In one or more embodiments of the invention, the access includes establishing the organization of the shared virtual disk so that each virtual machine may send read requests and write requests for the data (e.g., one or more files) in the shared virtual disk. The entity servicing the read request (e.g., a driver in the production host environment) may utilize the FBB virtual file system to identify the file(s), the storage location of the data corresponding to the file(s), and send API requests to the backup storage system to obtain the specified data.

Figure 3E:
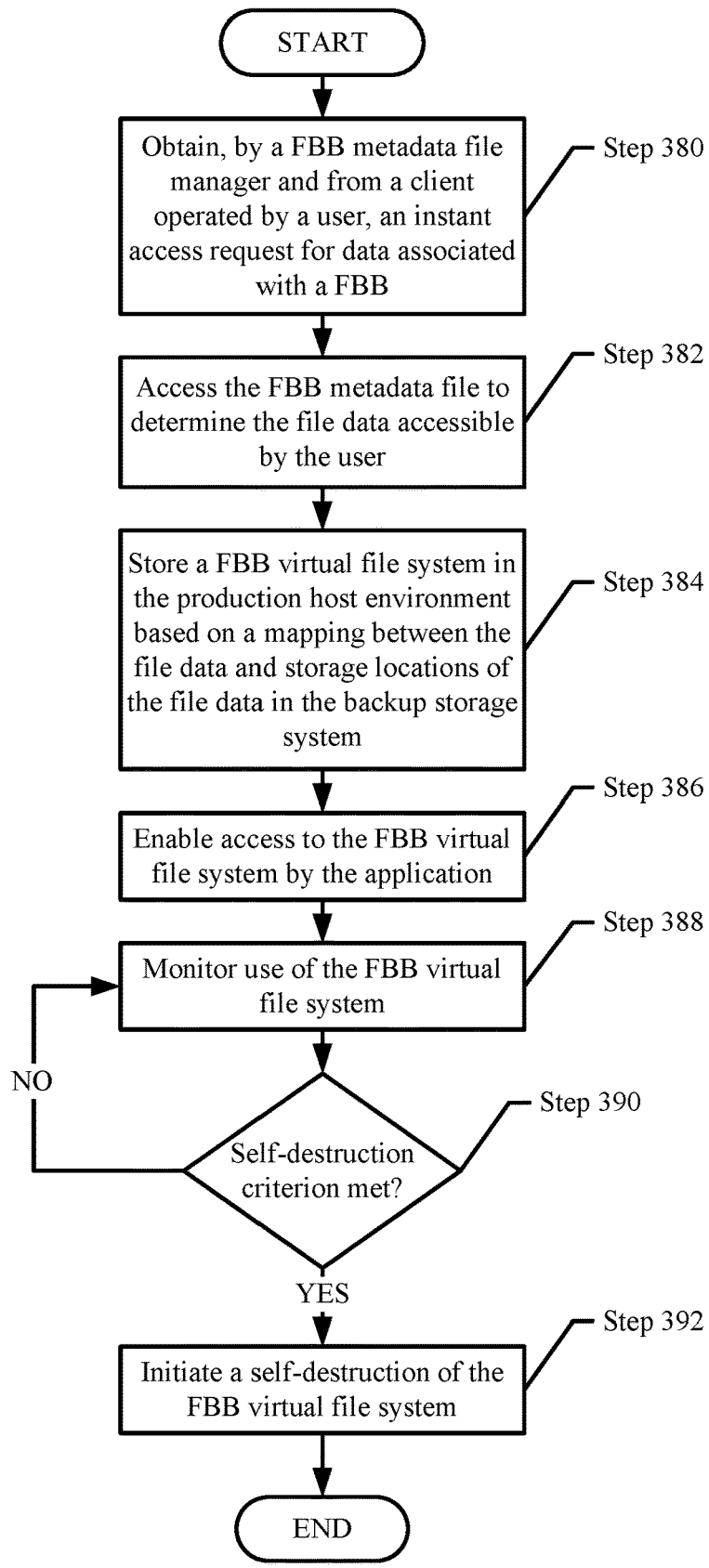
FIG. 3E shows a flowchart for managing self-destruction of a virtual file system in accordance with one or more embodiments of the invention.

FIG. 3E shows a flowchart for managing instant access of a file based backup based on storage devices in the backup storage system in accordance with one or more embodiments of the invention. The method shown in FIG. 3E may be performed by, for example, a FBB metadata file manager (e.g., 136, FIG. 1). Other components of the system illustrated in FIG. 1 may perform the method of FIG. 3E without departing from the invention.

Turning to FIG. 3E, in step 380, an instant access request is obtained for data associated with a file based backup (FBB). In one or more embodiments of the invention, similar to FIGS. 3A-3C, the instant access request specifies mounting a file system of at least a portion of the FBB in the production host environment such that the application has access to the data (e.g., files) in the FBB. The FBB mount request may specify the point in time associated with the file system. The instant access request may be obtained from an application operating in the production environment.

In step 382, a FBB metadata file corresponding to the FBB is accessed from the backup storage system to determine file data accessible to the application. In one or more embodiments of the invention, the FBB metadata file manager may send a request (e.g., as an API command) to the backup storage system that specifies the FBB metadata file of the identified FBB. Based on the obtained FBB metadata file, the FBB metadata file manager may determine the files and/or directories that are associated with the user of the application sending the instant access request. The data of the determined files and/or directories are included in the determined file data. In this manner, if the FBB includes other files that are associated with other users that are not the user sending the instant access request, the other files are not identified or provided to the user in response to the instant access request.

In step 384, a FBB virtual file system is generated and stored in the production host environment based on the attribute analysis. In one or more embodiments of the invention, the FBB virtual file system is an organization of the storage attributes such that the application may access (e.g., read) data of the file system from the FBB. The FBB virtual file system would be organized on a file-storage basis such that the FBB virtual file system would specify each file in the file system of the FBB and the storage of the data corresponding to each file.

In step 386, access to the FBB virtual file system by the application is enabled. In one or more embodiments of the invention, the access includes establishing the organization of the FBB virtual file system so that the application may send read requests for the data (e.g., one or more files) in the FBB. The entity servicing the read request (e.g., a driver in the production host environment) may utilize the FBB virtual file system to identify the file(s), the storage location of the data corresponding to the file(s), and send API requests to the backup storage system to obtain the specified data.

In step 388, use of the FBB virtual file system is monitored. In one or more embodiments, the use is monitored by identifying whether the application is sending read or write requests to the FBB virtual file system. After the most recent request is sent, a use timer is started that tracks a time since the last time the FBB virtual file system was accessed.

In step 390, a determination is made about whether a self-destruction criterion is met. In one or more embodiments of the invention, the self-destruction criterion is based on the user timer reaching a predetermined threshold. The predetermined threshold may be a period of time that is used to determine that the FBB virtual file system has been idle for too long, and as such, the FBB virtual file system should auto-destruct (also referred to as "self-destruct").

In one or more embodiments, the predetermined threshold is determined based on a size of the file data provided by the FBB virtual file system. For example, the predetermined threshold may be a larger period of time for larger sizes of file data. In another embodiment, the predetermined threshold is based on the size of the file(s) that have been opened (e.g., accessed) by the application. In another example, the predetermined threshold may be a larger period of time for larger sizes of opened file data.

In step 392, a self-destruction of the FBB virtual file system is initiated. In one or more embodiments, the FBB virtual file system performs the self-destruction by dismounting such that the virtual file system is no longer active and no longer provides access to any application. In this manner, the FBB virtual file system no longer takes up processing or other resources of the production host environment to provide its functionality.

The following describes five examples that describe use cases of various embodiments disclosed herein. The examples are illustrated in FIGS. 4A-4E. The Examples are not intended to limit the invention and is independent from any other examples discussed in this disclosure. Each example illustrated in FIGS. 4A-4E may illustrate a set of actions performed by one or more components of the system illustrated in FIGS. 4A-4E. The actions may be illustrated as circled numbers and described below using bracketed numbers (e.g., "[1]").

Example 1

Figure 4A:
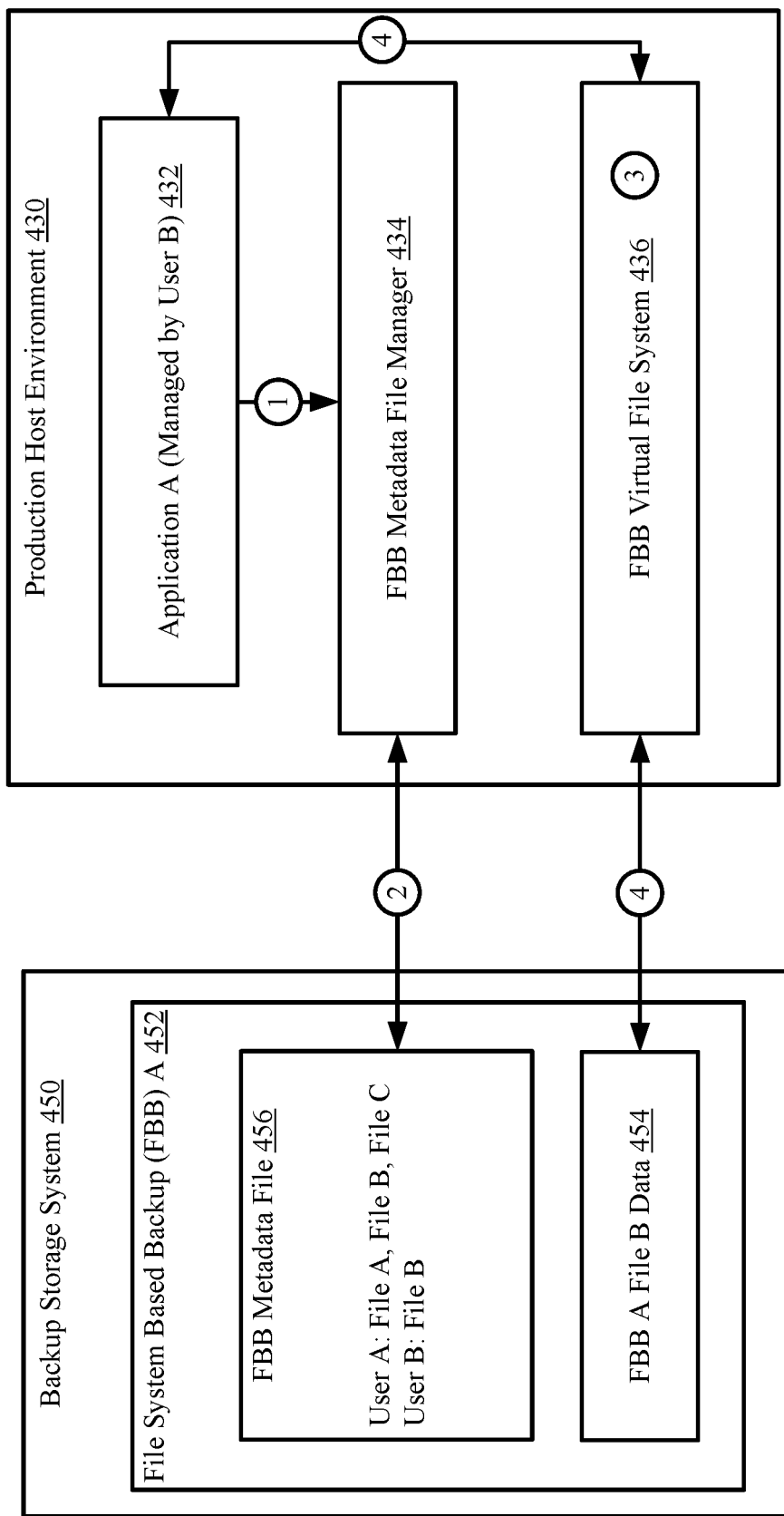
FIGS. 4A-4E show examples in accordance with one or more embodiments of the invention.

The following section describes an example illustrated in FIG. 4A. Turning to the example, consider a scenario in which a backup storage system stores a file based backup (FBB) in a common data streaming format (CDSF). An application operated by a user would like to access the FBB from the backup storage system in which it is stored.

FIG. 4A shows a diagram of an example system. The example system includes the backup storage system (450) and a production host environment (430). For the sake of brevity, not all components of the example system are illustrated in FIG. 4A. The backup storage system (450) includes FBB A (452) which includes FBB file B data (454) and a FBB metadata file (456). The production host environment includes an application A (432) and a FBB metadata file manager (434). Application A (432) is managed by user B. User B logs in to the application (432) to access the application.

Application A (432) sends an instant access request to the FBB metadata file manager (434) that specifies the mounting of FBB A (452) for access by application A (432) [1].

The FBB metadata file manager (434) performs the method of FIG. 3A to mount FBB A (452). Specifically, the FBB metadata file manager (434) obtains relevant attributes from the FBB metadata file (456) such as the storage location, file names, and file paths of the FFB A data A (454) [2]. Further, the FBB metadata file manager (434) determines, using the FBB metadata file (456), which files in the FBB are accessible to user B. Based on the analysis of the FBB metadata file (456), the FBB metadata file manager (434) determines that user B is authorized to access file B (454) of the FBB (452). The FBB metadata file manager (434) utilizes the relevant attributes of file B (454) to generate a FBB A virtual file system (436) [3]. The FBB virtual file system (436) specifies file B in the file system of the FBB (452) and the storage location of file B in the backup storage system (450). The FBB virtual file system (436) further includes the file paths used for accessing by the application (432). The application, in response to the generation of the FBB virtual file system (436) accesses the file B data (454) in the backup storage system (450) [4].

End of Example 1

Example 2

Figure 4B:
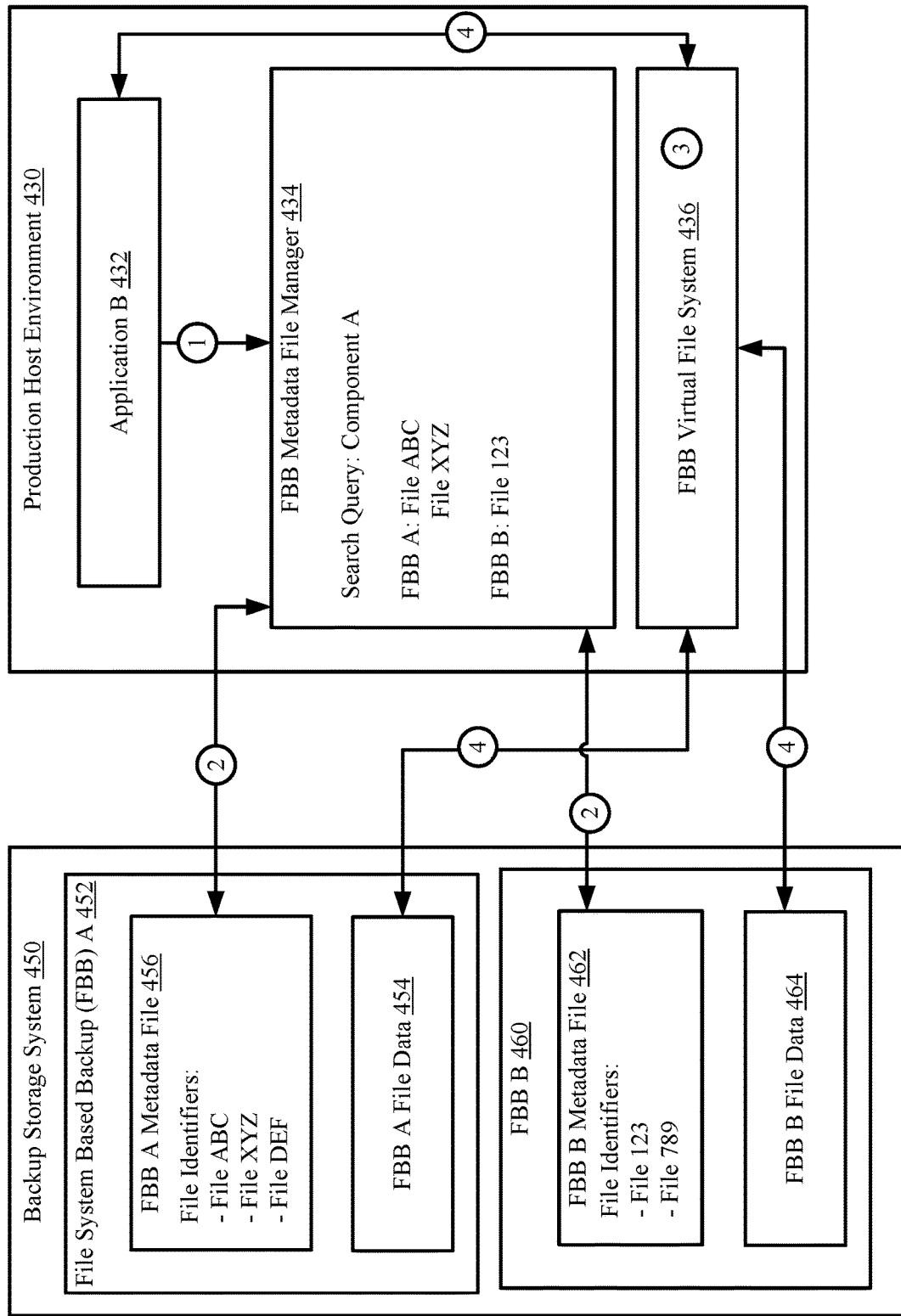

The following section describes a second example illustrated in FIG. 4B. Turning to the example, consider a scenario in which a backup storage system stores a file based backup (FBB) in a common data streaming format (CDSF). An application operated by a user is searching for a file that includes a specific component.

FIG. 4B shows a diagram of an example system. The example system includes the backup storage system (450) and a production host environment (430). For the sake of brevity, not all components of the example system are illustrated in FIG. 4B. The backup storage system (450) includes FBB A (452) that includes FBB A file data (454) and a FBB A metadata file (456). The backup storage system (450) further includes a second FBB (FBB B (460)) that includes FBB B file data (464) and a FBB B metadata file (462). The production host environment includes an application A (432) and a FBB metadata file manager (434).

Application A (432) sends a search request to the FBB metadata file manager (434) that specifies finding files that include component A [1].

The FBB metadata file manager (434) performs the method of FIG. 3B to provide search results. The search results specify the files that include component A as identified by FBB metadata file manager (434). Specifically, file ABC, file XYZ, and file 123 are each specified as a search result. Files ABC and XYZ are part of FBB A (452), and file 123 is part of FBB B (460). Based on the search results, the FBB metadata file manager mounts FBB A (452) and FBB B (460). Specifically, the FBB metadata file manager (434) obtains relevant attributes from the FBB A metadata file (456) and the FBB B metadata file (464) such as the storage location, file names, and file paths of files ABC, XYZ, and 123 [2]. The FBB metadata file manager (434) utilizes the relevant attributes of file files ABC, XYZ, and 123 to generate a FBB virtual file system (436) [3]. The FBB virtual file system (436) specifies the aforementioned files in the respective FBBs (452, 460) and the storage location of such files in the backup storage system (450). The FBB virtual file system (436) further includes the file paths used for accessing by the application (432). The application, in response to the generation of the FBB virtual file system (436) accesses the file data (454, 464) of the corresponding files in the backup storage system (450) [4].

End of Example 2

Example 3

Figure 4C:
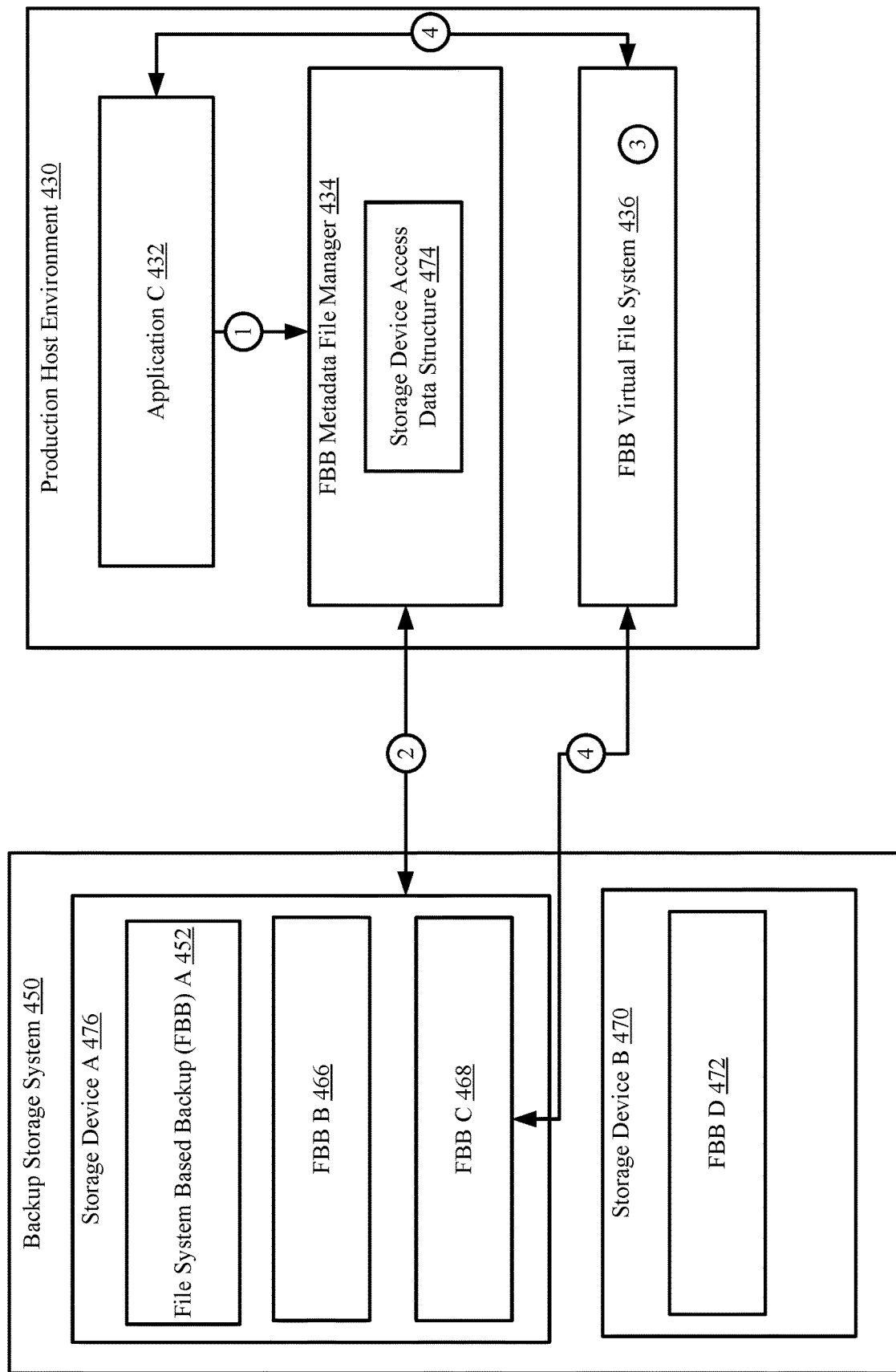

The following section describes an example illustrated in FIG. 4C. Turning to the example, consider a scenario in which a backup storage system stores a file based backup (FBB) in a common data streaming format (CDSF). An application operated by a user would like to access the FBB from the backup storage system in which it is stored.

FIG. 4C shows a diagram of an example system. The example system includes the backup storage system (450) and a production host environment (430). For the sake of brevity, not all components of the example system are illustrated in FIG. 4A. The backup storage system (450) includes storage device A (476), which stores FBB A (452), FBB B (466), and FBB C (468), and storage device B (470), which stores FBB D (472). The production host environment includes an application A (432) and a FBB metadata file manager (434).

Application A (432) sends an instant access request to the FBB metadata file manager (434) that specifies the mounting of FBBs C (468) and D (472) [1].

The FBB metadata file manager (434) performs the method of FIG. 3C to consult a storage device access data structure (474) to determine the FBBs that the application (432) is authorized to access. Specifically, the storage device access data structure (474) specifies that application C (432) has access to the data in storage device A (476) and does not have access to any data in storage device B (470). Further, the FBB metadata file manager (434) determines that FBB C (468) is stored in storage device A (476) and that FBB D (472) is stored in storage device B (470). Based on this analysis, the FBB metadata manager (434) determines that FBB C may be provided to application C (432) and not FBB D (472).

Based on the determination, the FBB metadata manager further performs the method of FIG. 3C to mount FBB C (468). Specifically, the FBB metadata file manager (434) obtains relevant attributes from the FBB metadata file (456) such as the storage location, file names, and file paths of the FFB C (468) [2]. Further, the FBB metadata file manager (434) determines, using a FBB metadata file (not shown) of FBB C, the storage attributes of the file data of FBB C (468). The FBB metadata file manager (434) utilizes the relevant attributes of FBB C (468) to generate a FBB virtual file system (436) [3]. The FBB virtual file system (436) specifies the files in FBB C (468) and a mapping to the storage location of each file of FBB C (468) in the backup storage system (450). The FBB virtual file system (436) further includes the file paths used for accessing by the application (432). The application, in response to the generation of the FBB virtual file system (436) accesses the file B data (454) in the backup storage system (450) [4].

End of Example 3

Example 4

Figure 4D:
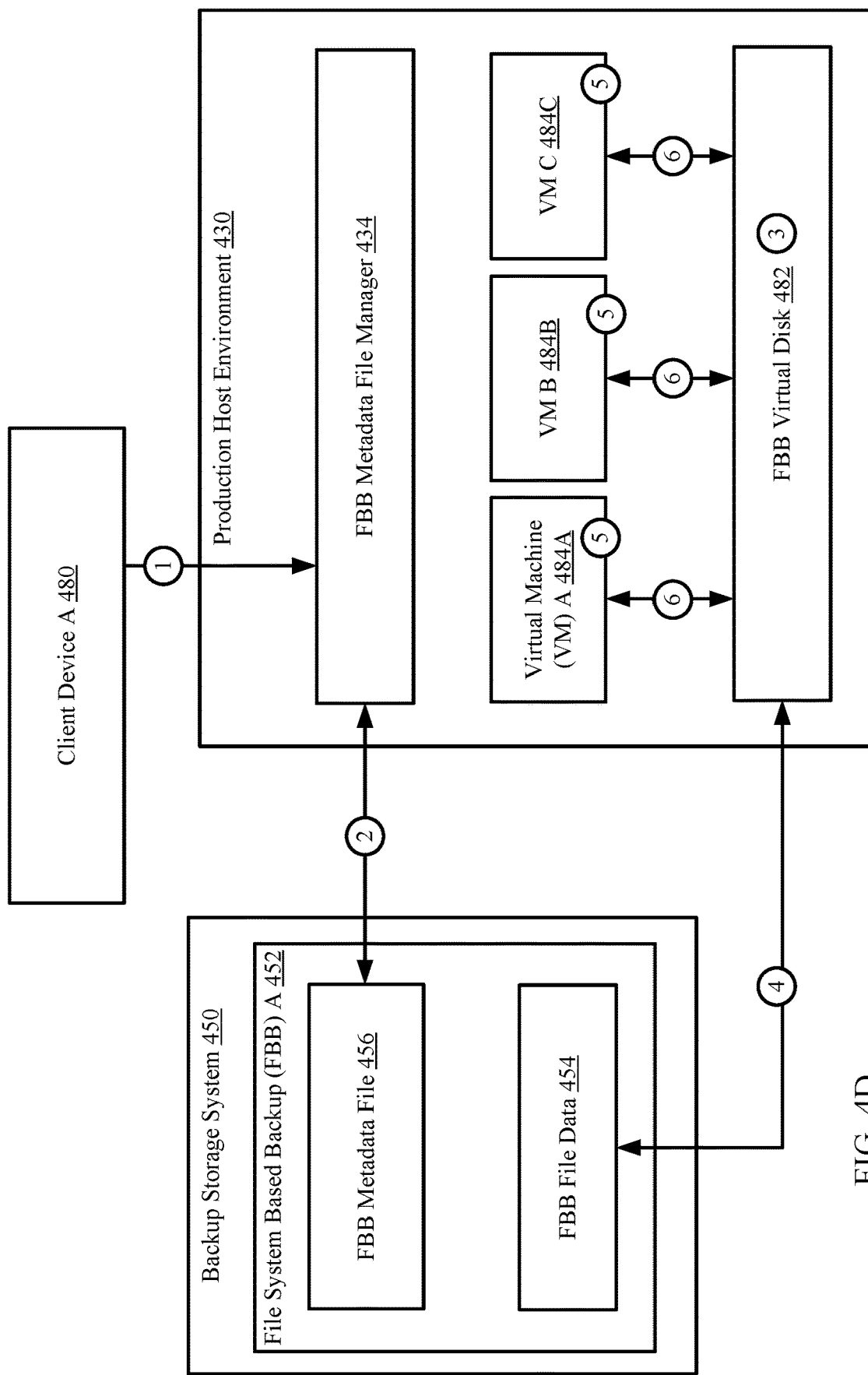

The following section describes an example illustrated in FIG. 4D. Turning to the example, consider a scenario in which a backup storage system stores a file based backup (FBB) in a common data streaming format (CDSF). A client device would like to install a set of application instances that access the same FBB.

FIG. 4D shows a diagram of an example system. The example system includes the backup storage system (450), a client device A (480) and a production host environment (430). For the sake of brevity, not all components of the example system are illustrated in FIG. 4A. The backup storage system (450) includes FBB A (452) which includes FBB file B data (454) and a FBB metadata file (456). The production host environment includes an application A (432) and a FBB metadata file manager (434).

Client device A (480) sends a shared access request to the FBB metadata file manager (434) that specifies generating a set of virtual machines that each operate their own operating systems and access the same FBB [1].

The FBB metadata file manager (434) performs the method of FIG. 3D to mount FBB A (452). Specifically, the FBB metadata file manager (434) obtains relevant attributes from the FBB metadata file (456) such as the storage location, file names, and file paths of the FFB A data A (454) [2]. The FBB metadata file manager (434) utilizes the relevant attributes of file B (454) to generate a FBB virtual disk (482) [3]. The FBB virtual file disk (482) includes a copy of the FBB file data (454) of the files in the FBB (452). The FBB virtual file system (436) further includes the file paths used for accessing by the application (432). The application, in response to the generation of the FBB virtual file system (436) copies the file data (454) in the backup storage system (450) to the FBB virtual disk (482) [4].

After the FBB virtual disk (482) is generated, the FBB metadata file manager (434) generates three VMs (484A, 484B, 484C) [5]. Each VM (484A, 484B, 484C) include an instance of a database that reads from the FBB virtual disk (482) and writes data to the files specified in the FBB (452) [6].

End of Example 4

Example 5

Figure 4E:
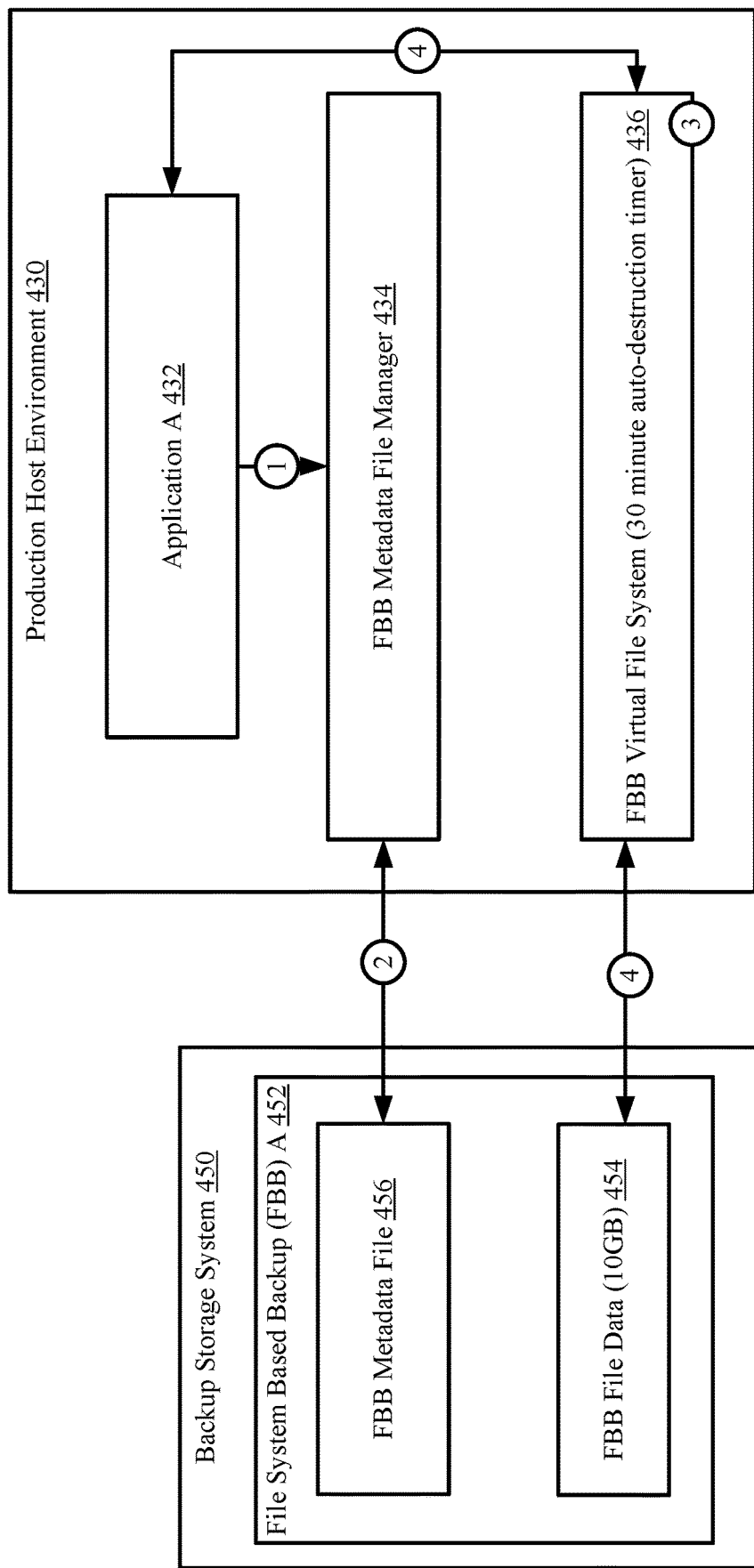

The following section describes an example illustrated in FIG. 4E. Turning to the example, consider a scenario in which a backup storage system stores a file based backup (FBB) in a common data streaming format (CDSF). An application operated by a user would like to access the FBB from the backup storage system in which it is stored.

FIG. 4E shows a diagram of an example system. The example system includes the backup storage system (450) and a production host environment (430). For the sake of brevity, not all components of the example system are illustrated in FIG. 4A. The backup storage system (450) includes FBB A (452) which includes FBB file B data (454) and a FBB metadata file (456). The production host environment includes an application A (432) and a FBB metadata file manager (434).

Application A (432) sends an instant access request to the FBB metadata file manager (434) that specifies the mounting of FBB A (452) for access by application A (432) [1].

The FBB metadata file manager (434) performs the method of FIG. 3A to mount FBB A (452). Specifically, the FBB metadata file manager (434) obtains relevant attributes from the FBB metadata file (456) such as the storage location, file names, and file paths of the FFB A data A (454) [2]. Further, the FBB metadata file manager (434) determines, using the FBB metadata file (456), which files in the FBB are accessible to user B. Based on the analysis of the FBB metadata file (456), the FBB metadata file manager (434) determines that user B is authorized to access file B (454) of the FBB (452). The FBB metadata file manager (434) utilizes the relevant attributes of file B (454) to generate a FBB A virtual file system (436) [3]. The FBB virtual file system (436) specifies file B in the file system of the FBB (452) and the storage location of file B in the backup storage system (450). The FBB virtual file system (436) further includes the file paths used for accessing by the application (432). The application, in response to the generation of the FBB virtual file system (436) accesses the file data (454) in the backup storage system (450) [4].

The FBB virtual file system (436) includes a self-destruction criterion that includes auto-destructing after an idle timer (e.g., a time elapsed without activity by the application (432) using the FBB virtual file system (436)) exceeds a pre-determined threshold. The pre-determined threshold is based on the size of the FBB file data (454) provided in the FBB virtual file system (436). For a size of 10 gigabytes (GB), the pre-determined threshold is determined to be 30 minutes.

After the application (432) does not use the FBB virtual file system (436) to access the FBB file data (454) in the backup storage system (450) for 30 minutes. After this, the auto-destruction criterion is met, and the FBB virtual file system (436) performs the auto-destruction. The auto-destruction includes dismounting the file system in the application (432) and removing the services provided by the FBB virtual file system (436) to no longer provide access to the data in the FBB file data (454).

End of Example 5

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the operation of the storage and access of data for file systems stored in backups stored in a backup storage system. Embodiments of the invention provide a use of a virtual file system that is tailored to access data for a file based backup that is stored in a format that would otherwise make access to such data difficult.

Embodiments of the invention further include providing temporary storage devices for requested data in the file based backup to be accessed by applications. The use of the temporary storage devices prevent modifications to the data in the file based backups, which would be undesirable when restoring the file system to a previous point in time. Further, the data in the temporary storage device may be used for future backups of the file system.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing access to file based backups (FBBs), the method comprising:

obtaining, by a FBB metadata file operating in a production host and from an application, a shared access request for a plurality of virtual machines (VMs) to access a FBB, wherein the FBB is stored in a backup storage system, wherein the shared access request specifies reading and writing data in the FBB of the plurality of FBBs;

in response to the shared access request:

accessing a FBB metadata file associated with the FBB to determine file data accessible to the plurality of VMs, wherein the file data is associated with the application;

performing an attribute analysis on the FBB metadata file to identify storage location attributes, wherein the storage location attributes are each associated with a storage location of a portion of the file data in the backup storage system;

generating a shared virtual disk in the production host based on the attribute analysis, wherein the shared virtual disk maps the file data to the storage locations;

generating the plurality of VMs, wherein the VMs read from and write to the shared virtual disk; and enabling access to the FBB virtual file system by the plurality of VMs.

2. The method of claim 1, wherein the production host is operatively connected to the backup storage system.

3. The method of claim 1, wherein the storage location attributes comprise at least one of: a file identifier attribute, a parent file identifier and a container identifier, a file size, a hash value of a file, and an offset of the file.

4. The method of claim 1, wherein the FBB metadata file comprises a plurality of root paths for a file system of the FBB.

5. The method of claim 1, wherein the FBB comprises the file data and the FBB metadata file.

6. The method of claim 5, wherein the file data comprises data tags.

7. The method of claim 5, wherein enabling access to the FBB virtual file system comprises:

obtaining a read request for a file of the file data from the application;

identifying, using the FBB virtual file system, a file path based on the storage of the file system data in the backup storage system;

based on the file path, obtaining the data from the backup storage system; and providing the data to the application.

8. A non-transitory computer readable medium comprising computer readable program code, which when executed by a computer processor enables the computer processor to perform a method for managing access to file based backups (FBBs), the method comprising:

obtaining, by a FBB metadata file operating in a production host and from an application, a shared access request for a plurality of virtual machines (VMs) to access a FBB, wherein the FBB is stored in a backup storage system, wherein the shared access request specifies reading and writing data in the FBB of the plurality of FBBs;

in response to the shared access request:

accessing a FBB metadata file associated with the FBB to determine file data accessible to the plurality of VMs, wherein the file data is associated with the application;

performing an attribute analysis on the FBB metadata file to identify a storage location attributes, wherein the storage location attributes are each associated with a storage location of a portion of the file data in the backup storage system;

generating a shared virtual disk in the production host based on the attribute analysis, wherein the shared virtual disk maps the file data to the storage locations;

generating the plurality of VMs, wherein the VMs read from and write to the shared virtual disk; and enabling access to the FBB virtual file system by the plurality of VMs.

9. The non-transitory computer readable medium of claim 8, wherein the production host is operatively connected to the backup storage system.

10. The non-transitory computer readable medium of claim 8, wherein the storage location attributes comprise at least one of: a file identifier attribute, a parent file identifier and a container identifier, a file size, a hash value of a file, and an offset of the file.

11. The non-transitory computer readable medium of claim 8, wherein the FBB metadata file comprises a plurality of root paths for a file system of the FBB.

12. The non-transitory computer readable medium of claim 8, wherein the FBB comprises the file data and the FBB metadata file.

13. The non-transitory computer readable medium of claim 12, wherein the file data comprises data tags.

14. The non-transitory computer readable medium of claim 12, wherein enabling access to the FBB virtual file system comprises:

obtaining a read request for a file of the file data from an application;

identifying, using the FBB virtual file system, a file path based on the storage of the file system data in the backup storage system; and based on the file path, obtaining the data from the backup storage system; and providing the data to the application.

15. A system comprising:

a processor; and memory comprising instructions, which when executed by the processor, perform a method comprising:

obtaining, by a FBB metadata file operating in a production host and from an application, a shared access request for a plurality of virtual machines (VMs) to access a FBB, wherein the FBB is stored in a backup storage system, wherein the shared access request specifies reading and writing data in the FBB of the plurality of FBBs;

in response to the shared access request:

accessing a FBB metadata file associated with the FBB to determine file data accessible to the plurality of VMs, wherein the file data is associated with the application;

performing an attribute analysis on the FBB metadata file to identify a storage location attributes, wherein the storage location attributes are each associated with a storage location of a portion of the file data in the backup storage system;

generating a shared virtual disk in the production host based on the attribute analysis, wherein the shared virtual disk maps the file data to the storage locations;

generating the plurality of VMs, wherein the VMs read from and write to the shared virtual disk; and enabling access to the FBB virtual file system by the plurality of VMs.

16. The system of claim 15, wherein the production host is operatively connected to the backup storage system.

17. The system of claim 15, wherein the storage location attributes comprise at least one of: a file identifier attribute, a parent file identifier and a container identifier, a file size, a hash value of a file, and an offset of the file.

18. The system of claim 15, wherein the FBB metadata file comprises a plurality of root paths for a file system of the FBB.

19. The system of claim 15, wherein the FBB comprises the file data and the FBB metadata file.

20. The system of claim 19, wherein enabling access to the FBB virtual file system comprises:

obtaining a read request for a file of the file data from an application;

identifying, using the FBB virtual file system, a file path based on the storage of the file system data in the backup storage system; and based on the file path, obtaining the data from the backup storage system; and providing the data to the application.

* * * * *